United States Patent [19]

Mackenzie et al.

[11] 4,056,202

[45] Nov. 1, 1977

[54] BULK DISCRETE FIBROUS MATERIAL STORAGE AND FEEDING APPARATUS

[75] Inventors: Harold B. Mackenzie, Wheaton, Ill.; Ingvar G. Anderson, Dunedin, Fla.

[73] Assignee: New Life Foundation, Wheaton, Ill.

[21] Appl. No.: 626,104

[22] Filed: Oct. 28, 1975

[51] Int. Cl.² .................................................. B65G 65/24
[52] U.S. Cl. ................................ 214/17 C; 198/616; 198/626; 214/17 D
[58] Field of Search ................... 198/57, 58, 165, 167, 198/550, 616, 626; 214/17 D, 17 C

[56] References Cited

U.S. PATENT DOCUMENTS

| | | | |
|---|---|---|---|
| 481,958 | 9/1892 | Krause | 198/184 |
| 895,318 | 8/1908 | Warren | 198/165 |
| 2,879,904 | 3/1959 | Walsh et al. | 198/167 X |
| 3,103,301 | 9/1963 | Pierson | 214/17 D |
| 3,125,231 | 3/1964 | Mortland | 214/17 D |
| 3,542,216 | 11/1970 | Baltz | 214/17 D |
| 3,719,290 | 3/1973 | Voigtlaender | 214/17 D |
| 3,735,881 | 5/1973 | Wilding | 214/17 D X |

FOREIGN PATENT DOCUMENTS

| | | | |
|---|---|---|---|
| 1,336,540 | 7/1963 | France | 198/165 |
| 52,020 | 5/1890 | Germany | 198/165 |
| 33,665 | 8/1934 | Netherlands | 198/165 |

Primary Examiner—Robert G. Sheridan
Attorney, Agent, or Firm—Hill, Gross, Simpson, Van Santen, Steadman, Chiara & Simpson

[57] ABSTRACT

Apparatus for bulk discrete fibrous material storage and feeding comprises a bin receptive of a large volume of the bulk discrete fibrous material and having a bottom wall and upright side walls along the opposite sides of the bottom wall. Movable endless flexible conveyor means, are provided along the bottom and side walls for effecting movement of material in the bin toward and to discharge from a discharge end of the bin, such conveyor means being concurrently driven in the direction of the discharge end of the bin. The apparatus is especially suitable for handling sorted, fibrous, generally flocculent, shredded material such as may be derived from municipal waste and prepared for use as fuel.

35 Claims, 19 Drawing Figures

BULK DISCRETE FIBROUS MATERIAL STORAGE AND FEEDING APPARATUS

This invention relates to the handling of bulk discrete fibrous materials and is more particularly concerned with new and improved apparatus for large volume bulk discrete fibrous material storage and feeding.

A major problem has existed in the storage and handling of larger volumes of particulate fibrous, and more particularly generally flocculent, materials such as sorted, shedded fuel fractions of municipal waste to be used as fuel for various industrial purposes such as in industrial boilers, in electrical utility boilers, as a fuel fraction in cement kilns, and the like. For such uses large supplies of fuel must be maintained to assure efficient, continuous 24-hour and week-end operation of the fuel-consuming facility, a large volume of fibrous material of the character described has a tendency to compact and wad, and become difficult to remove from storage bins.

Heretofore, various attempts have been made to solve the problem by feeding the material from storage by chain buckets, augers and other types of mechanical advancing means, generally requiring substantial motivating power expenditure, and all too frequently subject to jamming and clogging of the material, to breakdowns and need for costly repair. Costly standby or reserve supply apparatus and standby alternate fuels have therefore been required in anticipation of failure of the handling equipment.

An important object of the present invention is to overcome the disadvantages, deficiencies, inefficiencies, or shortcomings and problems in prior apparatus of the character indicated, and to provide new and improved bulk discrete fibrous material storage and feeding apparatus.

Another object of the invention is to provide apparatus which will efficiently store large volume of bulk material and which will reliably feed the material as required with minimum power expenditure.

A further object of the invention is to provide new and improved apparatus especially useful in municipal waste disposal systems for storage and feeding of sorted, shredded fuel fractions of municipal waste.

According to features of the invention, there is provided apparatus for bulk discrete fibrous material storage and feeding, comprising a bin receptive of a large volume of the bulk material and having a bottom wall and upwardly extending side walls along the opposite sides of the bottom wall, there being movable endless flexible conveyor means along the bottom and side walls for effecting movement of material in the bin toward and to discharge from a discharge end of the bin, the conveyor means being driven for this purpose concurrently in the direction of the discharge end of the bin.

According to other features of the invention, means may be provided for loading material into the bin. Means may be provided to assure positive flow of material from the discharge end of the bin. Means may also be provided for assuring metered, substantially uniform flow toward the point of use of the material discharged from the bin.

Other objects, features and advantages of the invention will be readily apparent from the following description of certain representative embodiments thereof, taken in conjunction with the accompanying drawings, although variations and modifications may be effected without departing from the spirit and scope of the novel concepts embodied in the disclosure, and in which:

Figure 1:
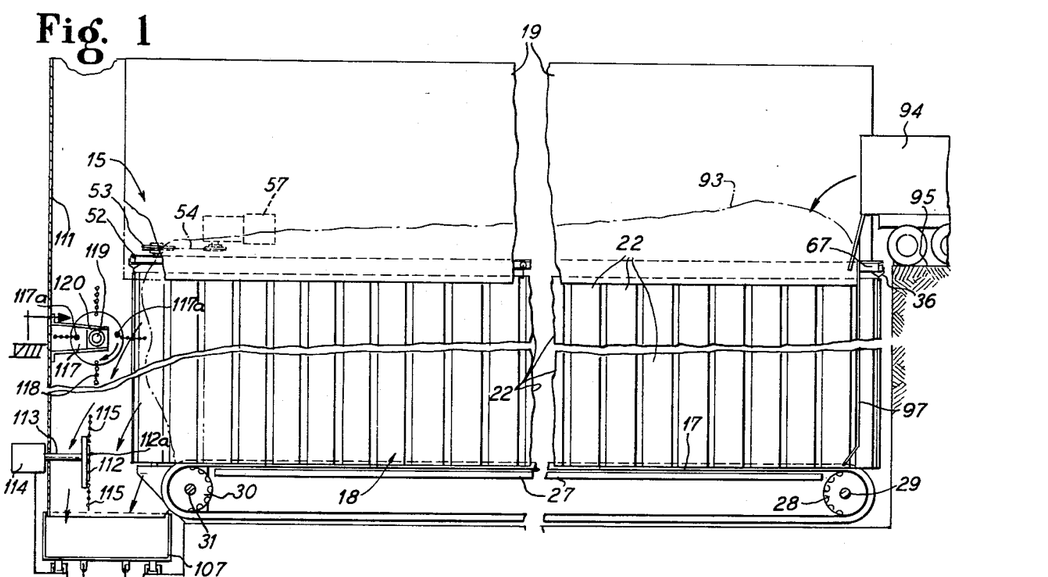
FIG. 1 is a fragmental vertical sectional elevational view taken substantially along the line I—I of FIG. 2 and showing apparatus embodying features of the inventivn.
Figure 2:
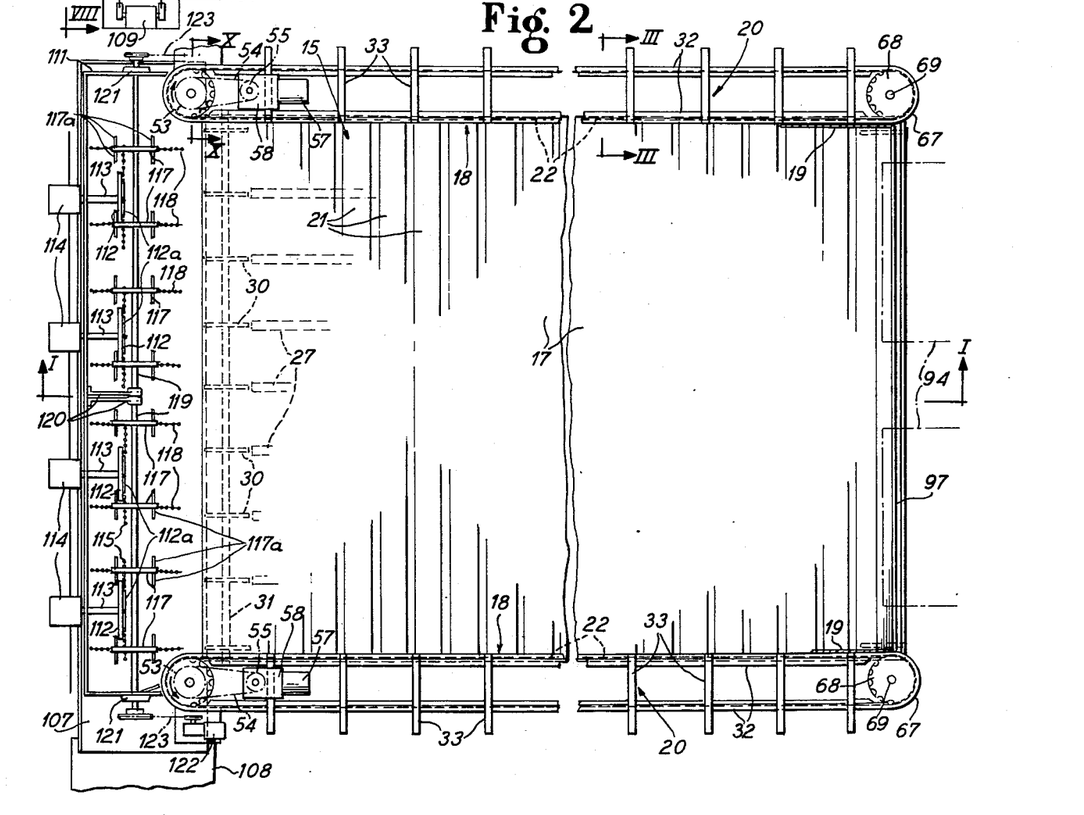
FIG. 2 is a fragmental top plan view of the apparatus.
Figures 10, 11, 12, 13, 14:
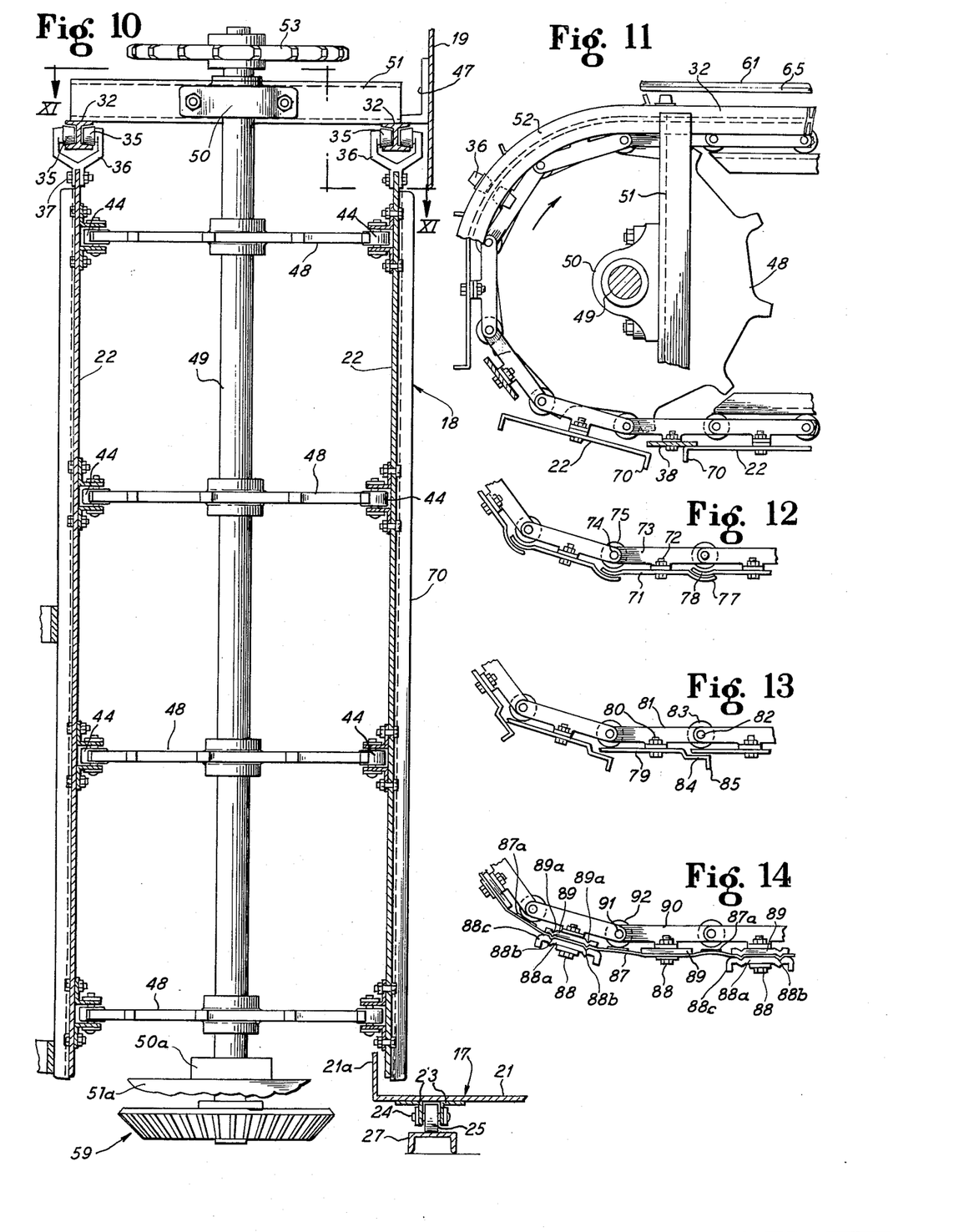
FIG. 10 is a enlarged fragmentary sectional elevational detail view taken substantially along the line X—X of FIG. 2.
FIG. 11 is a fragmentary sectional plan view taken substantially along the line XI—XI of FIG. 10.
FIG. 12 is a fragmentary edge view of a modified slatted flexible endless belt wall structure.
FIG. 13 is a similar edge view of another slatted flexible endless belt movable wall structure.
FIG. 14 is a similar edge view of a further modified flexible endless belt movable wall structure.
Figures 15, 16, 18, 19:
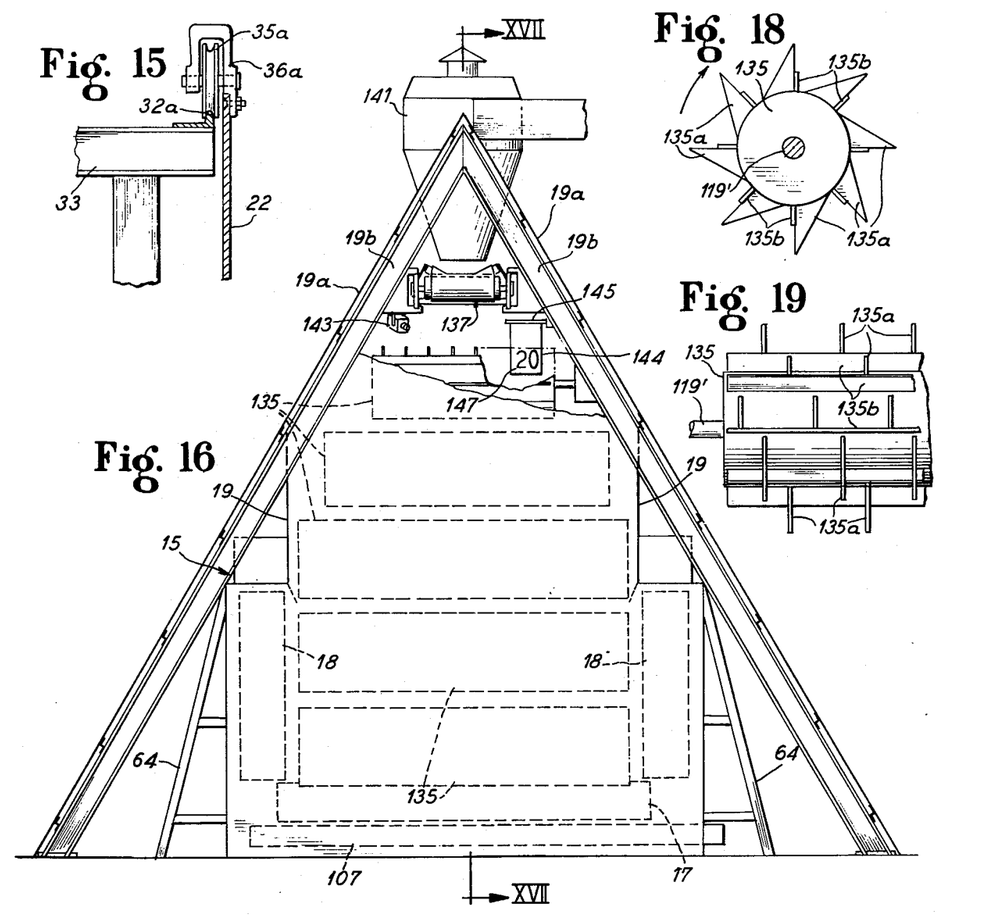
FIG. 15 is a fragmentary illustrative view of a modified means for hanging the movable portions of the side walls of the bin.
FIG. 16 is a schematic front elevational view of the apparatus and showing certain modifications.
FIGS. 18 and 19 are end and fragmentary side elevational breaker drum detail views.

Apparatus for bulk material storage and feeding comprises, according to the present invention, a large capacity self-unloading or discharging bin 15 (FIGS. 1 and 2). By way of example, for handling sorted, discrete fibrous, shredded municipal waste suitable for use as fuel in industrial boilers, turbine boilers in electrical utility plants, cement kilns, and the like, the bin 15 may have a many ton capacity, and be on the order of 100 to 200 feet long, about 37 feet wide and about 24 feet deep. The bin 15 is provided with a bottom wall 17 and upwardly extending side walls 18 along opposite sides of the bottom wall. For feeding or discharging material from the bin 15, movable means, desirably comprising endless forwardly movable flexible conveyor devices, e.g. drag chain conveyors, chain drag light conveyors, apron or slat or endless belt conveyors, extend along the bottom and the side walls throughout the length of the bin. The side walls 18 project slightly beyond the front end of the bottom wall 17 but the movable portions of the side walls may be about half the height of the bin. In its upper part, the bin 15 comprises solid stationary upward side wall extensions 19 with at least a partial opening between their rear ends and a full opening between their front ends. Means mounting the wall components comprise suitable frame structure 20 along each side of the bin. At their upper edges the extensions 19 may meet the inside of a bin shed roof 19a supported by upwardly converging beams 19b (FIG. 16). In one preferred form, the bottom wall 17 may comprise a link slat belt having articulated slats 21 (FIGS. 2, 8 and 10). Similarly, the movable portions of the side walls 18 may comprise articulated slats 22 (FIGS. 1, 3, 7, 10 and 11). Means for articulating the bottom wall slat 21 comprise, in effect, elongated chain links 23 (FIG. 10) connected by pins 24 which also serve as axles for anti-friction rollers 25 which, in the upper run of the bottom wall 17 run along longitudinally extending horizontal rail bars 27. A plurality of the chain link connections and rollers and track bars are spaced from one another across the width of the bottom wall 17, there being, for example, nine as indicated in FIG. 2. At opposite ends of the bin 15, the bottom wall articulating link chains run over suitable sprockets which engage with the rollers 25, there being sprockets 28 for this purpose mounted on a transverse idler shaft 29 at the rear of the bin, and respective sprockets 30 mounted on a transverse driven shaft 31 at the front of the bin. By driving operation of the shaft 31 the sprockets 30 are driven to drive the upper run of the endless bottom wall 17 forwardly toward the discharge end of the bin, with the return run of the bottom wall belt running rearwardly below the upper run under the rail bars 27 and moving into the upper run about the rear sprockets 28.

Figures 3, 4, 5, 6:
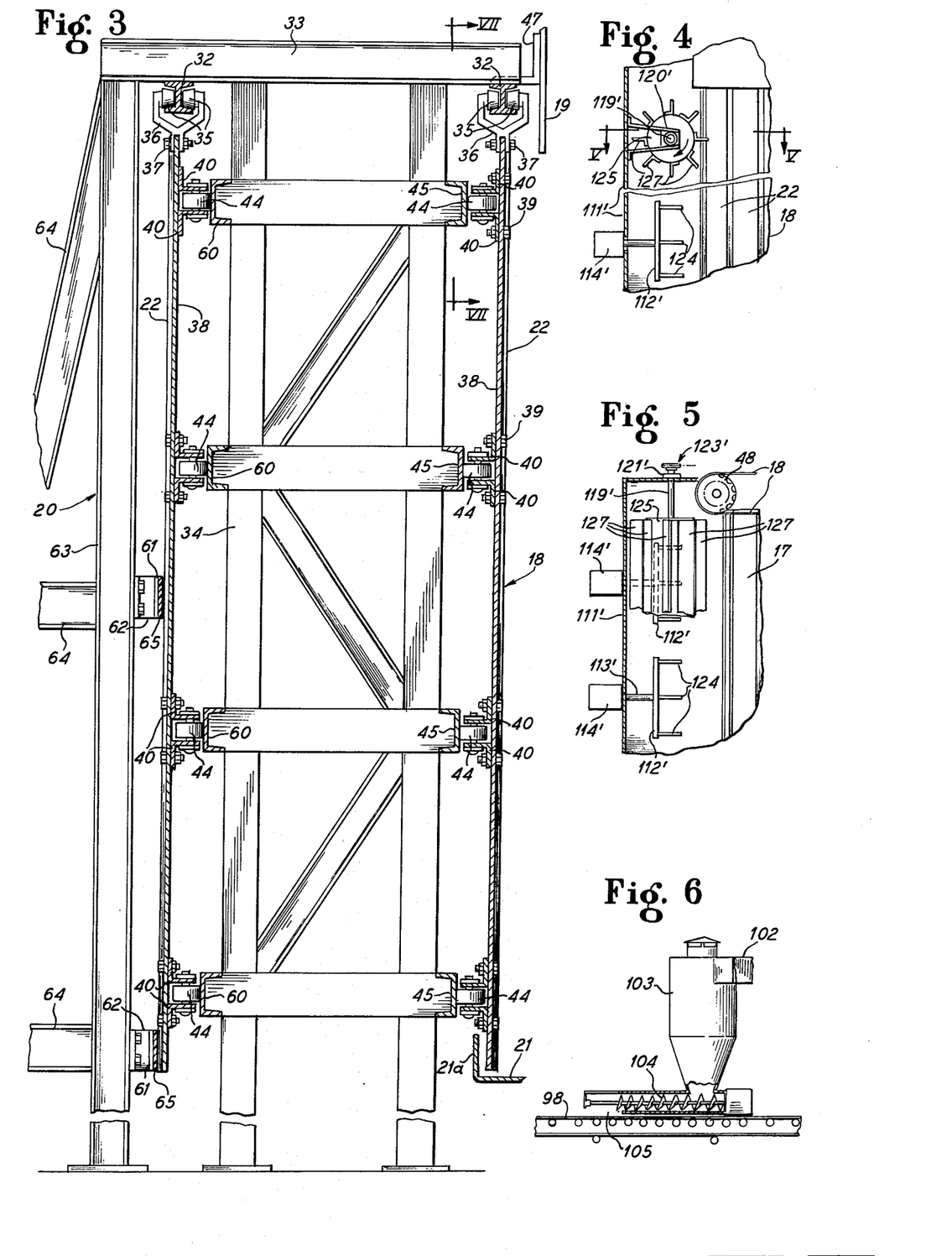
FIG. 3 is an enlarged fragmental vertical sectional detail view taken substantially along the line III—III of FIG. 2.
FIG. 4. is a fragmental vertical sectional elevational detail view showing modified breaker means for the discharge end of the apparatus.
FIG. 5 is a fragmentary sectional plan view taken substantially along the line V—V of FIG. 4.
FIG. 6 is a schematic illustration of a form of supply means for loading the bin.

Mounting and actuation of the slatted endless belt movable lower portions of the side walls 18 is effected in similar fashion, running suspension being provided therefor on the frame structures 20. As best seen in FIGS. 3, 7, 10 and 11, each of the frame structures 20 may have suspension tracks 32 desirably comprising I-beams fixedly secured to and supported by cantilever end portions of transverse header bars 33 supported on top of framework 34. Rollers 35 run in the tracks provided by the beams 32 and mount suspension yokes 36 which are secured as by means of bolts 37 to the upper ends of vertically extending intermediate slats 38 having secured thereto, as by means of bolts 39, horizontally extending articulating links 40 connected by means of pivot pins 41 to horizontal connecting links 42 secured as by means of bolts 43 to the backs of the movable side wall vertically extending slats 22. The pins 41 serve also as axles for rollers 44 which at the inner sides of the frame structures 20 run along longitudinally extending horizontal load-sustaining track bars 45 carried by the framework 34. As best seen in FIGS. 3 and 10, along the upper edges of the flexible conveyor portions of the side walls 18 lower edge portions of the side wall upward extension panels 19 extend downwardly protectively along the inner sides of the suspension yokes 36, the wall panels 19 being supported for this purpose on the header bars 33 as by means of brackets 47 suitably secured as by means of bolts or welding to the connected panels 19 and the header bars 33. Along the lower edges of the side walls 18, the bottom wall slats 21 extend thereunder and have upwardly projecting retainer flanges 21a which prevent any significant lateral escape of material from the bin.

If preferred, a generally barn door type of running hanger for the side wall slats 22 may be provided as shown in FIG. 15. In this arrangement respective rails 32a are supported on the header bars 33 and are engaged by grooved wheels 35a carried by hanger yokes 36a suitably secured to the upper ends of the slats 22. In other respects the running support for the slatted curtain side wall conveyor portions may be the same as already described.

For driving the flexible endless belt slatted conveyor portions of the side walls 18 in coordinated relation with the bottom wall 17, the link chains provided by the articulated links 40 and 42 are trained about driving sprockets 48 (FIGS. 10 and 11) carried by a vertical drive shaft 49 journaled as by means of a suspension bearing 50 carried by a header bar 51 supported on the track beam 32 and/or thrust bearing 50a on its lower end portion mounted on a frame member 51a. A front end turn-around 52 on the track beam 32 provides guide means for the roller yolks 36; and this also serves to maintain the chain link rollers 44 in mesh with the sprockets of the sprocket wheels 48. Drive means are connected with the upper end of the shaft 49, comprising a sprocket 53 (FIGS. 1, 2 and 10) over which is trained a sprocket chain 54 which meshes with a driving sprocket 55 drivingly coupled with a motor 57 through suitable transmission such as a gear box 58. Desirably a separate but coordinated driving assembly is provided for the movable portion of each of the movable portions of the side walls 18, as best visualized in FIG. 2.

Driving of the bottom wall 17 and the movable portions of the side walls 18 is desirably coordinated by having the bottom wall drive shaft 31 coupled to be driven through the side wall shafts 49 as by means of suitable bevel gear trains 59 (FIGS. 8 and 10).

In return run, the articulated slat flexible endless belt side wall assemblies are supported on return run portions of the track beams 32, and the rollers 44 run along horizontally extending return track bars 60 carried by the outer side of the framework 34. Any tendency for the return run of the slatted side wall assembly to whip is prevented by means of horizontal guide bars 61 secured as by means of brackets 62 bolted or welded to stabilizing framework 63 comprising part of the frame structure 20 located along the outer side of the return run of the endless side wall assembly and provided with laterally facing beam structure 64. Desirably anti-friction strip facing 65 such as urethane is carried by the guide face of each of the guide bars 61.

At the rear end of the bin, the articulated endless side wall assemblies are carried by respective arcuate rear return sections 67 of the track beams 32 into the bin wall runs of the side wall assemblies. In such return, idler sprockets 68 carried by vertical shafts 69 mesh with the chain link rollers 44.

Figure 7:
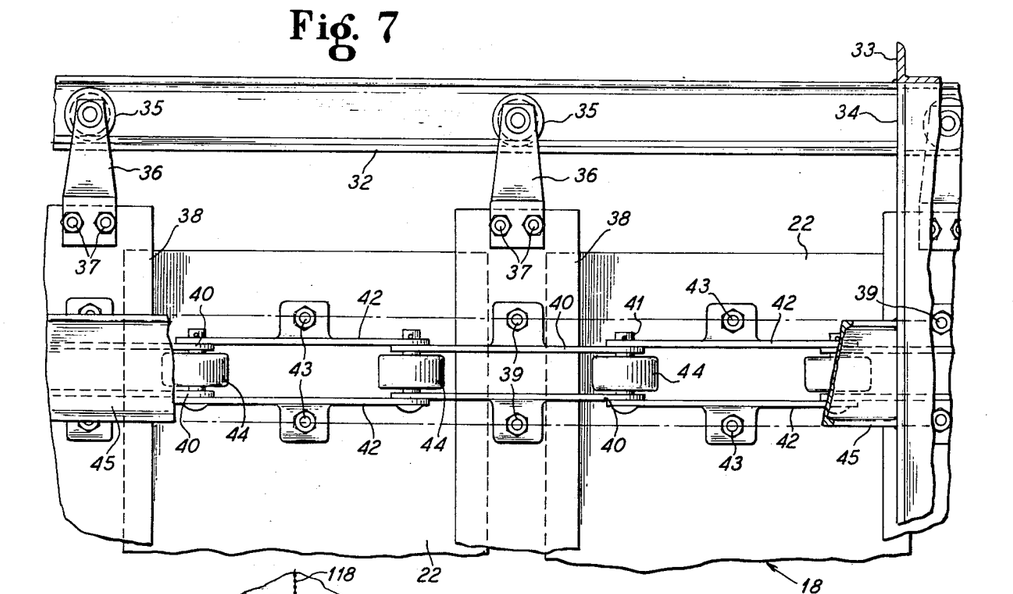
FIG. 7 is a fragmentary sectional elevational detail view taken substantially along the line VII—VII of FIG. 3.
Figure 8:
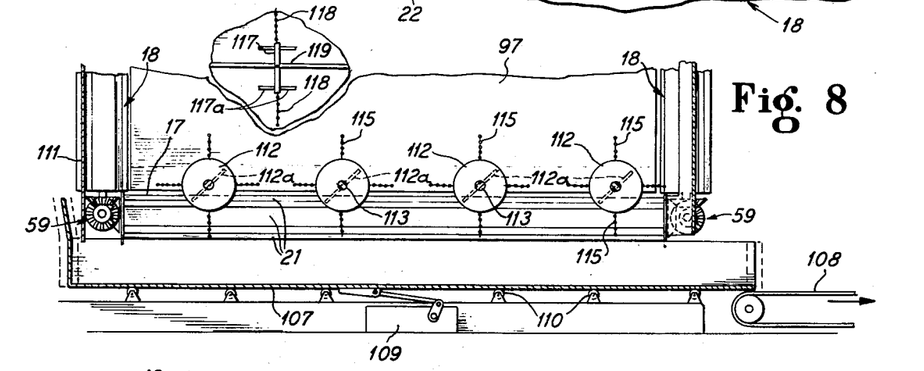
FIG. 8 is a fragmental sectional elevational view taken substantially along the line VIII—VIII of FIG. 1.

As best apparent in FIGS. 7 and 11, the slats 22 of the side wall assemblies are of substantial width, and the intermediate slat members 38 substantially narrower and lapped by the side margins of the slats 22 in the delivery running of the side walls, permitting articulating of the slats freely about the driving sprockets 48 and idler sprockets 68. To improve delivery traction with the material stored in the bin, the side wall slats 22 are desirably provided with cleat means such as cleat flanges 70 along their longitudinal edges and directed away from the chain sides of the slats.

Instead of the cleat flanged slat plates 22 and intermediate joint closing narrow slats 38, the slatted flexible endless belt side wall assemblies may take the form of FIG. 12 wherein flat plates 71 of suitable length and width have connected thereto as by means of bolts 72 chain links 73 articulated by means of pins 74 which also serve as axles for sprocket chain and load thrust sustaining rollers 75. In this instance, the opposite margins of the slat plates 71 are provided with trailing edge arcuate cleat flange formations 77 which freely lap over leading edge complementary arcuate formations 78 in articulated relation facilitating return run articulation of the endless belt assembly. This arrangement of the endless belt link assembly is well suited not only to the side walls 18 but also to the bottom wall 17.

In another desirable arrangement for the articulated side walls as shown in FIG. 13, the slat plates 79 are secured as by means of bolts 80 to chain links 81 connected by means of pin 82 serving also as axles for rollers 83 have trailing marginal portions 84 offset to lap over straight leading marginal portions of companion slats. The offset portions 84 provide cleats which are emphasized by angular cleat flanges 85 to assist in moving material in the delivery direction in the bin.

In another desirable form, the side walls 18 may comprise an endless belt 87 in the form of suitable heavy-duty curtain sheet material secured as by means of bolts 88 to vertically extending spaced narrow slat bars 89 secured as by means of the bolts 88 to chain links 90 connected in articulated relation by pins 91 serving also as axles for rollers 92. Each or every alternate one of the slats 89 may be modified to provide it with means for more positively anchoring the curtain sheet material thereto for resisting load tension imposed by the bin load being propelled forwardly during movement of the side wall conveyor, and to resist dead load imposed by the bin load material. For this purpose the slat bar 89 may be provided with spaced parallel longitudinally extending outwardly projecting interlock ribs 89a adjacent to its opposite edges. These ribs are adapted to interlock with a complementary outer face clamping plate 88a secured by the bolts 88 to the plate 89 and thereby effecting interlocking of the intervening areas of the endless belt material into respective grooves 88b in the plates 88a by action of the ribs 89a. The plates 88a also serve as buffers for the belt 87 along the rub nails 61,65, and may have cleat flanges 88c along their longitudinal edges. The curtain 87 may be reinforced as at 87a in areas confronting the rollers 92.

Material 93 (FIG. 1) to be stored in and delivered from the bin 15 may be supplied into the bin in any preferred manner such as by means of conveyances, e.g. trucks 94 (FIGS. 1 and 2). For this purpose a ramp 95 may be provided at a height about the same as the upper edges of the side walls 22 and at least high enough to permit dumping material from the supply conveyances 94 over a fixed transverse rear wall 97 extending between the rear ends of the forwardly running delivery runs of the movable portions of the side walls 18 and above the rear end of the forwardly running delivery run of the bottom wall 17. By driving the bottom wall 17 and the movable portions of the side walls 18 concurrently forwardly not only can the bin be loaded to maximum capacity by progressively distributing the load forwardly from the rear material supply receiving end, but material stored in the bin can be delivered from the front end of the bin which for this purpose is open above the front end of the bottom wall 17 and the front ends of the movable portions of the side walls 18.

Figure 9:
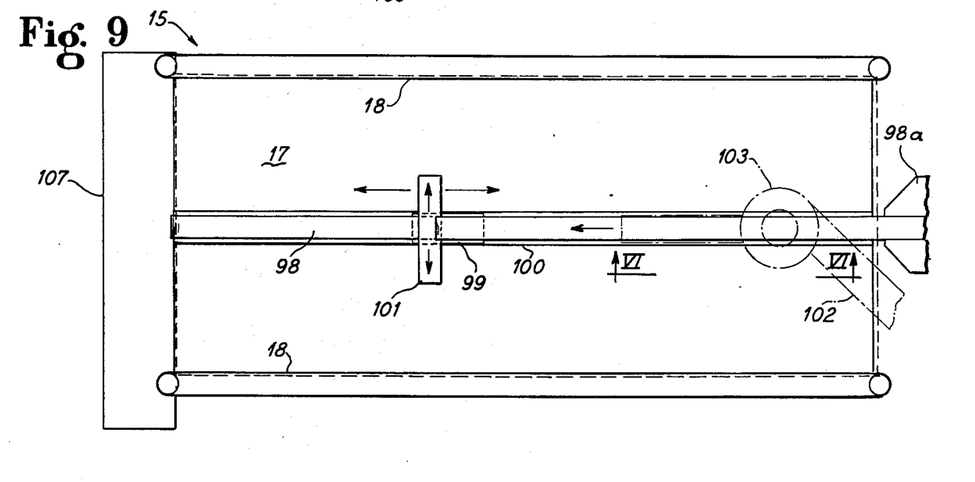
FIG. 9 is a schematic top plan view showing material supply means for loading the bin.

Alternatively, or in addition to conveyance supplied material, material to be stored in and delivered from the bin 15 may be directed into the bin by means of a belt conveyor 98 (FIGS. 6 and 9). In a desirable form, the conveyor 98 may be of the well-known movable tripper type (Link Belt or equivalent) having a carriage 99 which is reciprocatable along a track 100 extending longitudinally centered over the bin and having a tripper 101 onto which material delivered by the conveyor belt drops and is shunted into the bin for reasonably uniform filling of the bin. Material may be supplied to the conveyor 98 from any suitable source at the rear end of the belt, for example, from a ratio feeder 98a. Material may, if desired, be delivered from a sorting or classifying system through a duct 102 to a cyclone hopper 103 discharging directly to the belt conveyor 98 (FIG. 9) or through a screw conveyor 104 (FIG. 6) longitudinally overlying the conveyor 98 and discharging a uniform stream of the material through a port 105 onto the conveyor. In order to densify and reduce the flocculent nature of the material supplied through the screw conveyor 104, the auger portion thereof may have the flights progressively closer together toward the discharge port 105, thereby tending to compress the material, and squeeze air out of the material, whereby to increase the load capacity of the bin.

In operation of the bin 15, material accumulated therein is delivered as required by feeding it forwardly toward the discharge end of the bin by concurrently actuating the bottom wall 17 and the movable areas of the side walls 18 to move forwardly. This may be effected intermittently or at a continuous rate, depending upon requirements. From the discharge or delivery end of the conveyor, the material may be received in any preferred transporting means, one desirable form of which may comprise metering conveyor means in the form of a transversely extending vibrating or shaker conveyor 107 (FIGS. 1, 2 and 8) in the form of a flat bottom trough of substantial width closed at one end and of a length to underlie the entire width of the discharge end of the bin. At its opposite, open end, the shaker conveyor discharges onto an endless takeaway conveyor 108. Suitable means such as an eccentric vibrator or shaker actuator 109 mounted under the conveyor 107 and suitably connnected thereto effects vibrating or shaking movement of the conveyor 107 longitudinally thereof along supporting anti-friction rollers 110 on which the conveyor 107 is mounted. Range of to and fro movement of the conveyor 107 effected by the actuator 109 is represented by the dash lines in FIG. 8. Such movement results in a fairly uniform flow of material from the delivery end of the conveyor member 107 onto the takeaway conveyor 108.

Desirably a front stop wall or hood structure 111 is provided at the front of the bin assembly and well forwardly from the front ends of the upper bin walls 19 above the conveyor 107 to control displacement into the conveyor 107 of material from the advancing face of the bin load material 93. The hood structure 111 provides an enclosure not only at the front of the conveyor 107 but also at each opposite side of the discharge end of the bin, thus efficiently avoiding escape of delivered material beyond the conveyor 107.

Means are provided for assuring free flow of material and avoidance of compaction or bridging within the hood 111. In a desirable form dynamic, agitating or breaker means suitable for this purpose comprise a set of, in this instance four, breaker disks 112 (FIGS. 1, 2 and 8) having cross-bar "digger" means 112a (FIG. 8) on their material-opposing faces. These disks are mounted on horizontal shafts 113 which may project through the front wall of the hood 111 from driving motors 114. The breaker disks 112 have additional agitating means in the form of suitable lengths of chain flails 115 radially extensible and located at suitable circumferentially spaced intervals on each of the disks. By having the breaker disks 112 located at suitable intervals adjacently over the conveyor 107, clumps or compaction lumps of material dropping forwardly from the bin are broken up by the digger bars 112a and the flails 115.

Further assistance in breaking up material advancing from the bin is attained by provision of breaker means in the upper portion of the hood 111 and mounted rotatably on an axis extending transversely to the axes of the lower breaker disks 12. In one preferred form, breaker disks 117 are provided with generally axially extending breaker pins 117a and radially extending flails 118 of the same order as the flails 115. In a preferred arrangement a spaced pair of the breaker disks 117 is provided in general orientation above each of the lower breaker disks 112. Because of the long span across the upper portion of the hood 111, the upper breaker disks 117 are preferably mounted on a pair of coaxial shafts 119, respectively journaled in hanger bearings 120 at their adjacent ends and in bearings 121 at their outer ends which project through the opposite side walls of the hood structure 111. Each of the shafts 119 is desirably independently driven as by means of a motor and gear box combination 122 and a suitable endless flexible transmission 123 drivingly connected with the outer end of the shaft.

Instead of bars and flails, pin carrying breaker disks 112' (FIGS. 4 and 5) may be employed, each having a plurality such as four breaker pins 124 projecting generally axially from its inner face for, in effect, chewing into material displaced theretoward in the delivery operation of the bin. Similarly as with the flail type breaker disks 112 of FIG. 1, the breaker disks 112' are mounted corotatively on rotary shafts 113' projecting through the front wall of the hood structure 111' and driven by motors 114'.

Upper breaker means in the arrangement of FIGS. 4 and 5 may, if preferred comprise flail devices similar to the flail disks 117, or pin disks in which pins similar to the pins 124 project radially, but in an efficient device, as illustrated, the upper breaker means may comprise one or more, and preferably two elongated rotary members 125 which may comprise drum-like cylinders provided with longitudinally extending circumferentially spaced fixed beater vanes 127. Rotary mounting of the breaker members 125 may be effected similarly as the breaker disks 117, namely, each of the members 125 may be of a length to span generally half the width of the bin discharge opening and mounted corotatively on a rotary shaft 119' supported coaxially with its companion shaft at their adjacent ends by hanger bearings 120' and having their outer ends rotatably supported in bearings 121' mounted on the side walls of the hood structure 111' and driven in the same manner as the shafts 119 by a suitable power means such as motors operating to actuate the shafts through transmission means 123'. One single cylinder breaker member may also span the entire width of the bin discharge opening if desired.

In another desirable arrangement, as shown in FIGS. 16-19, the breaker function may be effected entirely by means of beater vane and digger teeth equipped rotary roll or drum breakers 135 generally similar to the rotary breakers 125 in FIG. 4. In FIGS. 16-19, however, the rotary breakers 135 are located in a vertically spaced stack relation. Five of the breakers 135 are shown, the stack extending substantially throughout the height of the front of the bin structure, not only adjacent to the front or discharge ends of the articulated side conveyor portions of the side walls 18, but also at the front end portions of the upper fixed side wall structures 19, to take care of maximum loading of the bin. By having the lowest breaker roll 135 rotating in the overhand direction (see directional arrow) toward the material at the bottom of the bin assures positive downward cascading of the bottom material toward the conveyor 107 from the advancing face of the mass load of the material. Rotation of all other rolls 135 in the under hand direction (see directional arrows) toward the material will tend to "toss" the material, fluff it up, prevent or break up "jamming" and help assure a continuous flow of material at the discharge end of bin 15 into conveyor 107. The breaker rolls 135 may also be fitted with long steel "digger teeth" 135a mounted thereon and backing up shorter beater vanes 135b, to tear up and loosen the advancing mass of material 93. The beater vanes 135b may in this case be constructed as plates mounted at the forward edges of the longer digger fingers. For greater efficiency the fingers 135a may be staggered as seen in FIG. 19. It will be understood, of course, with respect to the breaker rolls 135, as well as all of the other breaker devices that have been described, that coordinated operation will be effected of the breaker devices with bin load advancing operation of the movable bottom wall and the movable side wall conveyor devices.

Figure 17:
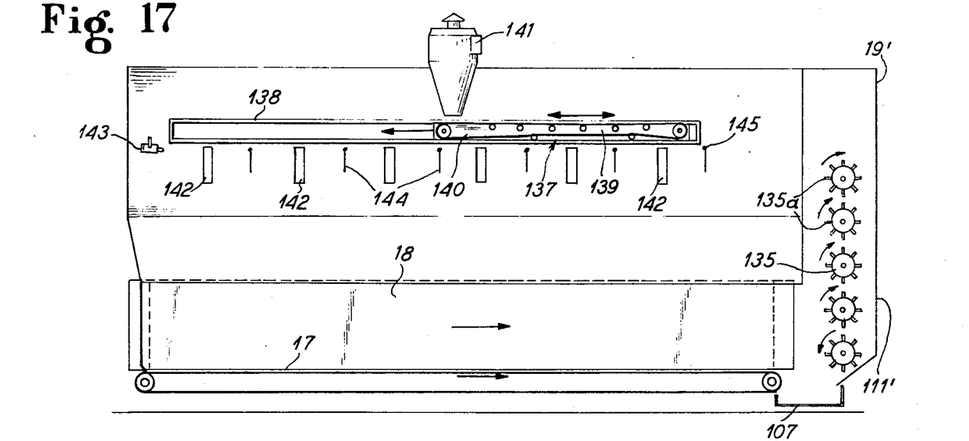
FIG. 17 is a longitudinal vertical sectional view taken substantially along the line XVII—XVII of FIG. 16.

Means to enable maximum efficient refilling of the bin may, as shown in FIGS. 16 and 17, comprise a longitudinally traveling shuttle conveyor 137 mounted on longitudinal rails 138, as close as practicable to the top of the preferably peaked roof bin housing shed. This conveyor 137 comprises an endless flexible belt 139 mounted to run selectively in either longitudinal direction on a carriage 140 running on the rails 138 and suitably powered to travel longitudinally along the rails in either direction at the desired loading speed. Material to be dumped into the bin from the supply conveyor 139 may be supplied through a hopper such as a cyclone 141 mounted preferably substantially centrally in the peak of the roof 19a of the bin shed and discharging onto the conveyor. If desired, the delivery cyclone device 141 may be provided with a material deareating and densifying auger or screw conveyor similar to the auger conveyor 104 in FIG. 6. By means of the shuttle conveyor 137, material can be supplied into the bin to the best advantage, for example toward the front portion of the bin, and as the load increases, gradually filling in toward the rear of the bin until the full load capacity has been reached.

Means are desirably provided for monitoring the load condition within the bin 15. This may be effected visually as through transparent corrugated roof panels or windows 142 located at a suitable height in the upper portions of the roof 19a such as a window at about each 20 foot interval longitudinally along the wall. However, more sophisticated monitoring means may be employed. One such means comprises a closed circuit television camera 143 mounted within the upper rear end of the bin housing and trained to observe gauging means at suitable intervals, such as at 20 foot intervals along the inside of the upper portion of the bin. In one convenient form, the gauging means may comprise flags 144 depending from horizontal poles 145 projecting from one of the upper side wall areas 19b as closely as practicable under the conveyor 137 and located at suitable intervals such as twenty feet apart and suitably identified as by means of location number indicia 147.

Thereby, only the gauging indicia 147 of those flags 144 which are not hidden within the material load will be observable, and by means of the monitoring TV circuit, including the camera 143, the extent of loading within the bin can be checked upon as desired.

Although the movable means of the base wall 17 may comprise the articulated slots 21, or a belt such as that in FIG. 14, a plurality of corunning cleated belts may be used. A chain drag flight conveyor device running over a solid stationary floor surface and provided with adequate cleats may be employed. Concurrent, coordinated running of any preferred movable floor means with the movable wall portions will, of course, be effected.

It will be understood that any suitable means for effecting manual or automatic operation of the various driving motors, and the like, including electrical circuitry and including automatic or manual control devices, switches, control console means, and the like may be provided as desired. Such means are readily available and need, therefore, not be more particularly described.

It will be understood that variations and modifications may be effected without departing from the spirit and scope of the novel concepts of this invention.

We claim as our invention:

1. In apparatus for bulk discrete fibrous material storage and feeding, including a bin receptive of a large volume load of the bulk material and having a bottom wall and upwardly extending side walls along the opposite sides of said bottom wall; movable conveyor means along said bottom wall and movable conveyor means along said side walls, said conveyor means cooperating to effect movement of material in the bin toward, and to discharge from, a discharge end of the bin; and means for driving said bottom wall and side wall conveyor means to run concurrently toward said discharge end to move the load of material progressively to discharge from said discharge end, the improvement comprising:

said side walls having frame structure;
suspension track means carried by said frame structure;
and suspension devices on the upper portions of said side wall conveyor means and running along said track means.

2. Apparatus according to claim 1, wherein said conveyor means comprise endless flexible conveyor devices.

3. Apparatus according to claim 1, wherein at least certain of said conveyor means comprise endless flexible conveyor devices having articulated slats equipped with cleat means.

4. Apparatus according to claim 1, wherein said conveyor means along the side walls comprise flexible sheet material.

5. Apparatus according to claim 1, including frame structure providing tracks extending longitudinally along the bottom wall of the bin, and rollers carried by said conveyor means along said bottom wall and running along said tracks.

6. Apparatus according to claim 1, wherein said side wall conveyor means comprise endless flexible devices, and means supporting the forward runs against lateral load displacement, and means protecting the return runs against whipping.

7. Apparatus according to claim 1, wherein said means for driving said conveyor means comprise chain link means carried by the movable means, driving sprocket means driving said chain link means; and means for driving said sprocket means.

8. Apparatus according to claim 1, wherein said means for driving include common power source means for said bottom wall conveyor means and for said side wall conveyor means.

9. Apparatus according to claim 1, wherein said means for driving said conveyor means include coordinating drive coupling between said bottom wall conveyor means and the side wall conveyor means.

10. Apparatus according to claim 1, including means closing the end of the bin opposite to said discharge end, and means adjacent to said opposite end for loading the bin with material.

11. Apparatus according to claim 1, including material supplying conveyor means located in the upper portion of said bin, said material supplying conveyor means being operable for distributing supplied material selectively along the length of the bin.

12. Apparatus according to claim 1, including upwardly extending stationary wall extensions above said side wall conveyor means and serving to increase the height of the bin above said side wall conveyor means.

13. Apparatus according to claim 1, including takeaway conveyor means receptive of material discharged from said discharge end of the bin, and means for controlling discharge of the material to said conveyor means.

14. Apparatus according to claim 13, wherein said controlling means comprise a hood structure at the discharge end of the bin.

15. Apparatus according to claim 1, including transverse metering conveyor means on which material discharged from the bin is received, and a takeaway conveyor receiving material from the metering conveyor.

16. Apparatus according to claim 1, including dynamic breaker means adjacent to the discharge end of the bin to assure discharge of the material from the bin, and means for driving said breaker means.

17. Apparatus according to claim 16, wherein said breaker means comprises a set of rotary members, and means for driving the rotary members.

18. Apparatus according to claim 16, wherein said breaker means comprise a plurality of rotary disks carrying breaker projections, and means rotatably mounting the disks.

19. Apparatus according to claim 16, wherein said breaker means comprise lowermost breaker devices adjacent to the discharge end of said bottom wall, and other breaker devices mounted above said lowermost breaker devices.

20. Apparatus according to claim 19, wherein all of said breaker devices comprise breaker rolls.

21. Apparatus according to claim 1, including shuttle conveyor means for loading the bin with bulk discrete fibrous material.

22. Apparatus according to claim 1, including means for monitoring the load volume condition within the bin.

23. Apparatus according to claim 1, including dynamic breaker means adjacent to the discharge end of the bin to assure discharge of the material from the bin, and means for driving said breaker means, said breaker means comprising a plurality of vertically spaced rolls extending across said discharge end and each of the rolls having a circumferentially spaced longitudinally extending and radially projecting series of beaters vanes, each of the vanes being backed up by a series of digger teeth mounted therealong and projecting radially beyond the vanes.

24. In apparatus for bulk discrete fibrous material storage and feeding, including a bin receptive of a large volume load of the bulk material and having a bottom wall and upwardly extending side walls along the opposite sides of said bottom wall; movable conveyor means along said bottom wall and movable conveyor means along said side walls, said conveyor means cooperating to effect movement of material in the bin toward, and to discharge from, a discharge end of the bin; and means for driving said bottom wall and side wall conveyor means to run concurrently toward said discharge end to move the load of material progressively to discharge from said discharge end, the improvement comprising:

said side wall conveyor means comprising endless belt type conveyors having forward runs inside the bin and return runs outside the bin;

longitudinally extending suspension tracks adjacent to the upper portions of the forward and return runs of said wall conveyor means; and rollers suspending the forward and return runs of the side wall conveyor means from said suspension tracks.

25. Apparatus according to claim 24, including longitudinally extending guide track means on said side walls opposing the side wall conveyors spaced below said suspension tracks, and anti-friction means on said side wall conveyor means running along said guide track means.

26. Apparatus according to claim 25, comprising anti-whipping means cooperating with the return runs of the side wall conveyors.

27. In apparatus for bulk discrete fibrous material storage and feeding, including a bin receptive of a large volume load of the bulk material and having a bottom wall and upwardly extending side walls along the opposite sides of said bottom wall; movable conveyor means along said bottom wall and movable conveyor means along said side walls, said conveyor means cooperating to effect movement of material in the bin toward, and to discharge from, a discharge end of the bin; and means for driving said bottom wall and side wall conveyor means to run concurrently toward said discharge end to move the load of material progressively to discharge from said discharge end, the improvement comprising:

said side walls having frame structure;

suspension track means carried by said frame structure;

suspension devices on the upper portions of said side wall conveyor means and running along said track means;

and means for monitoring the load volume conditions within the bin, comprising a plurality of members suspended in the upper portion of the bin in longitudinally spaced relation over the bin contents, and means for observing the relationship of said members in the bin volume adjacent thereto.

28. Apparatus according to claim 27, wherein said suspended members comprise flags, and said means for observing comprise a closed circuit television camera.

29. Apparatus according to claim 27, wherein said bin has a substantial upward extension above said side wall conveyor means, and said monitoring means are located in the upper portion of said upward extension.

30. In apparatus for bulk discrete fibrous material storage and feeding, including a bin receptive of a large volume load of the bulk material and having a bottom wall and upwardly extending side walls along the opposite sides of said bottom wall; movable conveyor means along said bottom wall and movable conveyor means along said side walls, said conveyor means cooperating to effect movement of material in the bin toward, and to discharge from, a discharge end of the bin; and means for driving said bottom wall and side wall conveyor means to run concurrently toward said discharge end to move the load of material progressively to discharge from said discharge end, the improvement comprising:

said side walls having frame structure;

suspension track means carried by said frame structure;

suspension devices on the upper portions of said side wall conveyor means and running along said track means;

and breaker means facing toward the advancing material adjacent to said discharge end and comprising a plurality of horizontally spaced breaker disks rotatably on axes longitudinal relative to the direction of movement of said conveyor means toward said discharge end, said disks having means thereon for effecting agitation of material advancing against the disks.

31. Apparatus according to claim 30, wherein said agitation means comprise rigid fingers projecting toward the material advancing toward the disks.

32. Apparatus according to claim 30, wherein said means for agitating comprise flails carried by the disks.

33. Apparatus according to claim 30, including additional material agitating means mounted above said disks and acting on material advancing theretoward to cause material to drop down toward said disks.

34. Apparatus according to claim 33, wherein said additional material agitating means comprise rotary members carrying flails.

35. Apparatus according to claim 33, wherein said additional material agitating means comprise horizontal shafts carrying disks at spaced intervals therealong, said spaced disks having agitator fingers extending axially of the shaft.

* * * * *